(12) United States Patent
Dahlfort et al.

(10) Patent No.: US 9,331,807 B2
(45) Date of Patent: May 3, 2016

(54) SERVICE EDGE HUB DEVICE AND METHODS IN AN OPTICAL NETWORK NODE

(71) Applicant: TELEFONAKTIEBOLAGET L M ERICSSON (PUBL), Stockholm (SE)

(72) Inventors: Stefan Dahlfort, Santa Clara, CA (US); Ming Xia, Milpitas, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 242 days.

(21) Appl. No.: 13/651,877

(22) Filed: Oct. 15, 2012

(65) Prior Publication Data

US 2014/0105600 A1    Apr. 17, 2014

(51) Int. Cl.
*H04J 14/00* (2006.01)
*H04J 14/02* (2006.01)

(52) U.S. Cl.
CPC ......... *H04J 14/0204* (2013.01); *H04J 14/0205* (2013.01); *H04J 14/0212* (2013.01)

(58) Field of Classification Search
CPC .............. H04J 14/0204; H04J 14/0205; H04J 14/0212; H04Q 11/0005; H04Q 2011/0015
USPC ..................................................... 398/48–51
See application file for complete search history.

(56) References Cited

U.S. PATENT DOCUMENTS

| | | | | |
|---|---|---|---|---|
| 5,521,732 A | * | 5/1996 | Nishio | 398/51 |
| 5,838,848 A | * | 11/1998 | Laude | H04Q 11/001 385/24 |
| 6,826,368 B1 | * | 11/2004 | Koren | H04J 14/0227 370/466 |
| 7,110,671 B1 | * | 9/2006 | Islam | 398/51 |
| 7,408,639 B1 | * | 8/2008 | Strasser | G02B 6/2706 356/328 |
| 7,835,645 B2 | * | 11/2010 | Eiselt | H04J 14/0204 398/50 |
| 7,983,560 B2 | * | 7/2011 | Maki | H04J 14/0204 398/48 |
| 8,190,027 B2 | * | 5/2012 | Boduch | H04J 14/0204 385/16 |
| 8,457,496 B2 | * | 6/2013 | Zami | H04J 14/0204 398/48 |
| 2002/0186432 A1 | * | 12/2002 | Roorda | H04J 14/0204 398/82 |
| 2008/0002974 A1 | * | 1/2008 | Zhong | H04J 14/0204 398/48 |
| 2008/0138068 A1 | * | 6/2008 | Akiyama | H04J 14/0209 398/50 |
| 2008/0317466 A1 | | 12/2008 | Chung et al. | |

(Continued)

OTHER PUBLICATIONS

Shifu Yuan; Madamopoulos, N.; Helkey, R.; Kaman, V.; Klingshirn, J.; Bowers, J., "Fully Integrated NxN MEMS Wavelength Selective Switch with 100% Colorless Add-Drop Ports," Optical Fiber communication/National Fiber Optic Engineers Conference, 2008. OFC/NFOEC 2008. Conference on , vol. No. pp. 1,3, Feb. 24-28, 2008.*

(Continued)

*Primary Examiner* — Ken Vanderpuye
*Assistant Examiner* — Abbas H Alagheband
(74) *Attorney, Agent, or Firm* — Patent Portfolio Builders, PLLC (57) ABSTRACT

The present invention relates to a node of an optical network, methods and service edge hub devices attachable to an optical network carrying data traffic comprising data information on a number of optical wavelength channels in one or more optical fibers. said hub device comprising one or more optical ports connectable to one or more service equipment arrangements for digital processing the received data information, the hub comprising a wavelength switching means configured to connect each channel to the ports, wherein the wavelength switching means comprises an optical splitter arrangement for spreading and directing the channels to the different ports, in one direction, and network ports, in the other direction.

10 Claims, 9 Drawing Sheets

(56) References Cited

U.S. PATENT DOCUMENTS

| | | | |
|---|---|---|---|
| 2009/0142058 A1* | 6/2009 | Schimpe | H04J 14/0204 398/50 |
| 2009/0175620 A1* | 7/2009 | Bhatnagar | G02B 6/29383 398/48 |
| 2009/0232497 A1* | 9/2009 | Archambault | H04J 14/0206 398/50 |
| 2010/0034532 A1* | 2/2010 | Ghelfi | H04J 14/0204 398/2 |
| 2011/0188853 A1* | 8/2011 | Schimpe | H04J 14/0208 398/38 |
| 2012/0155871 A1* | 6/2012 | Fukashiro | H04J 14/02 398/50 |

OTHER PUBLICATIONS

Gringeri, et al. Flexible Architectures for Optical Transport Nodes and Networks. IEEE Communication Magazine, vol. 28 No. 7. Jul. 1, 2010.

Turkcu, O. et al. Performance of Optical Networks with Limited Reconfigurability. IEEE / ACM Transactions on Networking. vol. 17 No. 6. Dec. 1, 2009.

* cited by examiner

SERVICE EDGE HUB DEVICE AND METHODS IN AN OPTICAL NETWORK NODE

TECHNICAL FIELD

The present invention relates to a node of an optical network, methods and service edge hub devices attachable to an optical network.

BACKGROUND

Hub nodes are essential nodes in optical networks carrying data traffic comprising data information on a number of optical wavelength channels in optical fibres. The hub node connects uplink traffic from one or more network nodes to a higher-tiered network. The edge node then performs subscriber management and routes the uplink traffic, typically at the packet level, towards an appropriate destination, such as to content services, back towards the access networks, to the Internet, etc. Such edge node routing may entail sending the uplink traffic to a regional network, which operates back at the optical layer. Thus, a hub node connects to multiple edge nodes and the edge nodes in turn connect to the regional network.

For an optical layer centric solution, transport convergence is essential, i.e. such transport network should be capable of transporting any type of service. Such services include mobile backhaul, either traditional Ethernet/packet based or main-remote based with, e.g. Common Public Radio Interface (CPRI), business services, and residential services. Some networks comprises in accordance with their defined functionality and configuration two transport interfaces: one at the access location and one at the service edge.

The service edge location can also be called a Hub to put emphasis on the typically more or less hubbed traffic profile or access/aggregation networks. At the service edge, the different services may be represented by different equipments/physical ports.

The physical ports at the Hub are typically fixed in wavelength. A hub arrangement comprises at least one Wavelength Selective Switch, WSS, for directing the wavelength channels and the data packets carried by the wavelength channels to different services, and for directing wavelength channels from the service equipment to a Central Office (CO) node. The WSS is connected to one or more COs. Such architecture has a number of problems and drawbacks, e.g.
  Underutilization as ports may not be needed for those particular connected COs or may be of the wrong wavelength for the service provided by the port;
  Lack of ports for a particular service.

SUMMARY

Embodiments herein advantageously solve said above described problems by offering a flexible optical layer.

Different aspects and examples of embodiments are presented herein and provided for solving said problems.

According to one aspect, examples of embodiments of service edge hub devices attachable to an optical network carrying data traffic comprising data information on a number of optical wavelength channels are provided. Said hub device comprises one or more optical ports connectable to one or more service equipment arrangements for digital processing the received data information. The hub device further comprises a wavelength switching means configured to connect each channel to the connectable ports, wherein the wavelength switching means comprises an optical splitter arrangement for spreading and directing the channels to the different connectable ports, in one direction, and one or more network ports, in the other direction.

According to further one aspect, embodiments of a node in an optical communications network are provided. Said node embodiments may comprise any of the service edge hub device embodiments provided herein.

According to additionally one aspect, examples of embodiments of methods in a service edge hub device attachable to an optical network carrying data traffic comprising data information on a number of optical wavelength are provided. Said hub device comprises one or more optical ports connected to one or more service equipment arrangements for digital processing the received data information. The hub device comprises a wavelength switching means configured to connect each channel to ports connected to the one or more the service equipment arrangement. Said method involves spreading and directing the channels to the different ports of the service equipment arrangements by means of the wavelength switching means comprising an optical splitter arrangement, in one direction, and one or more network ports connected to the optical network, in the other direction.

A number of advantages are achieved, such as:
  Improved utilization (less waste) of optical ports otherwise resulting from port-specific service, protocol and wavelength
  Single-homed fiber break protection;
  In-service upgrades, for example to a higher speed.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention.

However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

The present invention relates to a node of an optical network, methods and service edge hub devices attachable to an optical network. In the following, a generic tiered architecture for optical transport networks configured to transport wavelength division multiplexed, WDM, traffic is discussed. Thus, the following aspects and examples of embodiments presented herein may be applicable in different kinds optical communication networks, e.g. MetNet, etc., involving hub nodes. MetNet is here defined as a DWDM-centric access/agg-regration/metro optical transport solution for converged networks. The network nodes use wavelength layer switches, i.e. active WSSes. Total transmission distances are likely below 100 km and bitrates up to 10 Gbps in contrast with metro/regional networks. Bidirectional fiber transmission, narrow wavelength spacing (eg 25 GHz) and wide optical bands (e.g. C+L) are in the functional scope to be used when cost-efficient unless transmission prohibited.

Different equivalent expressions for an optical wavelength channel may be used herein, e.g. wavelength, channel, wavelength channel, carrier, optical carrier, optical channel, optical channel, wavelength carrier, etc.

Figure 1:
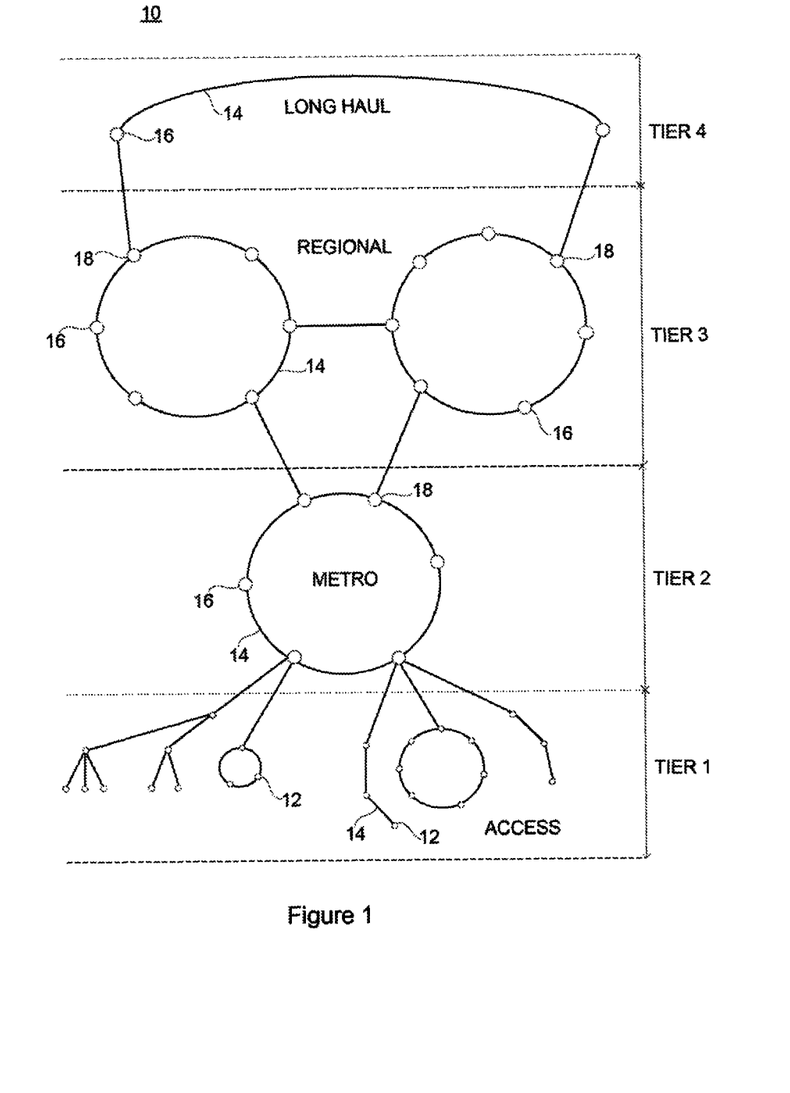
FIG. 1 is a block diagram of an exemplary network in which systems and methods described herein may be implemented.

FIG. 1 illustrates a generic tiered architecture 10 for optical transport networks configured to transport wavelength division multiplexed, WDM, traffic. The networks comprise optical fibres for carrying the optical traffic between the nodes of said networks. Access networks may also use wireless and copper wire for communication of signalling and payload traffic.

Each optical fibre system and network is configured to carry one or more wavelengths $\lambda=\lambda i$, i=1, 2, 3, , , , . Each wavelength constitutes a channel or optical carrier for carrying information, for example in data packets, according to any suitable protocol, e.g. Internet protocol. Each channel $\lambda$ uses a frequency band having a certain bandwidth wherein the wavelength $\lambda i$ is the centre frequency of the frequency band. In fibre-optic communications, wavelength-division multiplexing, WDM, is a technology which multiplexes a number of optical carrier signals onto a single optical fibre by using different wavelengths (i.e. colours) of laser light. This technique enables uni- or bi-directional communications over one strand of fibre, as well as multiplication of capacity. Said optical carriers or channels, i.e. wavelengths, are separated according to WDM systems, which are divided into different wavelength plans, coarse, CWDM, and dense, DWDM.

Dense WDM systems provide up to 40 channels at 100 GHz spacing or 80 channels with 50 GHz spacing in the 3rd transmission window, C-Band, of silica fibres around 1550 nm. Some technologies are capable of 12.5 GHz spacing or less (sometimes called ultra dense WDM).

In FIG. 1, the lowest tier shown, tier 1, includes a plurality of access networks that are each formed from a plurality of access nodes 12 interconnected via optical fibre 14 in a ring structure, a tree structure, star structure, bus structure, a mesh structure, or any combination thereof. In general, each access network aggregates uplink WDM traffic/services from the network and places the aggregated traffic onto a higher-tiered network; namely, a metro network at tier 2. The metro network is formed from a plurality of interconnected peer network nodes 16, also referred to as Central Offices, COs, and transports WDM traffic for the plurality of access networks. In this regard, each peer network node aggregates WDM traffic from one or more access networks to which it is connected and transports that aggregated traffic to a hub node 18 in the metro network.

The hub node 18 connects uplink traffic from one or more network nodes 16 to a higher-tiered network called the regional network. More specifically, the hub node 18 routes uplink traffic to an appropriate one of multiple edge nodes (not shown), e.g. a business services edge router, a residential services or a mobile services broadband network gateway, BNG, a broadband remote access server, BRAS, etc. The edge node then performs subscriber management and routes the uplink traffic, typically at the packet level, towards an appropriate destination, such as to content services, back towards the access networks, to the Internet, etc. Such edge node routing may entail sending the uplink traffic to the regional network, which operates back at the optical layer. Thus, although omitted from FIG. 1 for simplicity of illustration, the hub node 18 connects to multiple edge nodes and the edge nodes in turn connect to the regional network.

The regional network is also formed from a plurality of interconnected peer networks nodes 16, which hub WDM traffic to a hub node 18 in the regional network much the same as in the metro network. Traffic from the regional network is then placed onto a long haul network at tier 4, for inter-regional transport. Downlink traffic propagates through the networks in an analogous, but opposite, manner.

Known implementations of this tiered architecture 10 configure each peer network node 16 with significant routing flexibility. Each peer network node 16, for example, typically includes a reconfigurable optical add/drop multiplexers, ROADM, that enables any WDM traffic to be selectively added or dropped from the node 16. Equipped with such hardware, a peer network node 16 can immediately drop any uplink traffic that is received from another peer network node 16 if that traffic is destined for a connected lower-tiered network. However, because each ROADM requires at least two Wavelength Selective Switches, WSSs, just to provide this flexible routing capability and may require additional WSSs to provide full flexibility in adding or dropping wavelengths, known implementations prove cost-prohibitive and/or operationally limited in some contexts.

Embodiments herein advantageously reduce the complexity and accompanying cost of hub nodes 18. With reduced complexity and cost, the embodiments prove useful in a wider range of applications, such as optically converging the traffic of multiple services. In fact, some embodiments exploit the increased traffic resulting from such convergence in order to eliminate or at least mitigate the complexity that known networks incur for flexibility in traffic routing.

Figure 2:
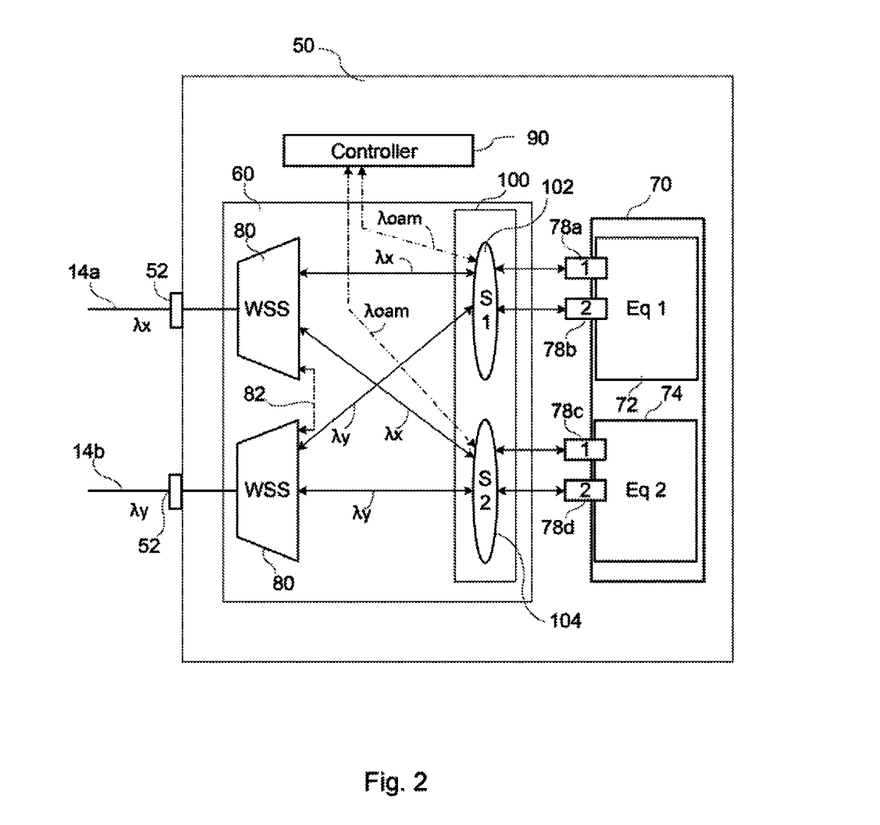
FIG. 2 is a block diagram illustrating an example of an embodiment of a hub configuration according to the invention.

FIG. 2 illustrates an example of an embodiment of a service edge hub device configuration according to the invention. Said hub device configuration 50 comprises a wavelength switching means 60, which are connected directly or indirectly to one or more ports 52. Said ports are bi-directional, i.e. each port is an input and output port, connecting an optical fibre from another node, preferably a Central Office, CO, node (not shown), either of the same network or another network in the same tier or another tier. Each optical fibre is configured to carry one or more wavelengths $\lambda=\lambda i$, i=1, 2, 3, . . . . Each wavelength constitutes a channel or carrier for carrying information, preferably in data packets, according to any suitable protocol, e.g. IP/MPLS/Ethernet, OTN, CPRI or legacy SONET/SDH protocol, which are well-known in the corresponding standards. Each channel $\lambda$ uses a frequency band having a certain bandwidth which is multiplexed together with a number of other optical carrier signals onto the single optical fibre by using different wavelengths, i.e. colours, of laser light according to wavelength-division multiplexing, WDM, technology.

According to one example of an embodiment, a wavelength switching means 60 may be equipped with one or more Wavelength Selective Switches, WSSs, 80, which also comprise bidirectional in- and output terminals for directing the received wavelengths λ, i.e. channels λ, towards an Optical Splitter arrangement 100 comprising one or more Optical Splitters 102, 104. In the illustrated example, the optical splitter arrangement 100 comprises two optical splitters indicated S1 102, and S2 104. The optical splitter arrangement 100 is configured to individually direct the wavelengths λ, i.e. channels λ, towards one or more ports of a service equipment arrangement 70.

A WSS as used herein is configured to selectively switch or otherwise route each wavelength received at its common port to any one of its dedicated ports, independently of how other wavelengths are routed, and to aggregate wavelengths received at its dedicated ports for output from the common port.

In this example, it is assumed that the service edge functions physically reside at the node 18 and within the hub node device 50, i.e. at the same location as the Hub WSSes. However, in other embodiments of the service edge hub device 50, said service edge functions physically reside outside the service edge hub device 50 but are connected to the hub device 50 via ports, In further embodiments, the service edge functions physically reside outside the hub device 50 and the node 18 but are connected to the hub device 50 via ports.

Said service equipment arrangement 70 may comprise one or more service equipment means for providing different services, e.g. mobile broadband backhaul, business services and residential services. Each of said ports may be dedicated to a certain one of said service equipment means 70.

In each of said ports one optical transceiver module 78 are plugged or attached into the ports. Said optical transceiver modules may be Single-Channel Optical modules (OMs) and/or Multi-Channel Optical Module (MC-OMs) 78. Said optical transceiver modules 78 are configured, fixed or tunable, to receive and transmit optical traffic on different wavelengths λ, i.e. channels λ. In the following examples and embodiments, Multi-Channel Optical Module (MC-OMs) are used as optical transceiver modules 78 throughout the description, not as a limitation but more of simplicity reasons. Thus, Single-Channel Optical modules (OMs) may also be used as modules 78.

An optical transceiver module, like a MC-OM, is a transceiver that transforms, or converts, signals between the optical domain and the electrical domain. Thus, a received optical signal is transformed to an electrical signal that is possible to process by processing means, e.g. a computer, digital processor, etc. If the optical signal carries data packets, the content in the headers and payload of said packets could be analysed and processed by the processing means in said service equipment means after the transforming to electrical signals. If the processed data information is meant to be sent back over the optical network, it is converted by the MC-OM 78 to the optical domain and sent on a predetermined channel having a certain wavelength λ. A Multi-Channel Optical Module 78 is in this way capable of handling a number of channels, e.g. $\lambda_1$-$\lambda_{20}$. Further one or more MC-OMs 78 may be plugged into the service equipment means to facilitate reception and transmitting of other wavelength bands comprising other wavelengths and number of wavelengths. Said further MC-OMs 78 are tuned to said other wavelength bands, e.g. $\lambda_{21}$-$\lambda_{30}$, $\lambda_{31}$-$\lambda_{60}$, etc.

The illustrated embodiment of a hub device 50 in FIG. 2 further comprises a hub controller 90 for controlling the operation and function of the hub device. It may be configured to control and direct the wavelengths λ, i.e. channels λ, via the optical splitter arrangement 100 to the correct MC-OMs, 78, of the service equipment arrangement 70 for optical traffic requesting a certain service via communication of control signalling carried in control channels λoam.

The operation of a hub device 50 according to the embodiment in FIG. 2 is described hereafter. Data traffic is received over the fibres, which connect the hub with other Central Office CO nodes, preferably one node per fibre. As an example, data traffic will be sent from a CO on an optical fibre, e.g. 14a, according to wavelength-division multiplexing, WDM, which multiplexes a number of optical carrier signals onto a single optical fibre by using different wavelengths of laser light. This technique enables bidirectional communications over one strand of fibres. Each optical fibre is configured to carry one or more wavelengths $\lambda = \lambda i$, i=1, 2, 3, , , . Each wavelength constitutes a channel or carrier for carrying information, preferably in data packets, according to any suitable protocol, e.g. IP/MPLS/Ethernet, OTN, CPRI or legacy SONET/SDH protocol, which are well-known in the corresponding standards. In this example, the data traffic is sent on optical wavelength channels λx in a wavelength band involving channels $\lambda_1$-$\lambda_{20}$ from one CO, denoted CO X, to the hub 50. The fibre 14a is attached to one of the hub ports 52. The channels are directly or indirectly guided from the port 52 to a wavelength switching means 60. In the present example wavelength switching means 60 is equipped with two Wavelength Selective Switches, WSSs, 80 and two optical splitters, or optical beam splitters, indicated S1 102, and S2 104. The WSSs 80 also comprise bidirectional in- and output terminals for directing the received wavelengths λx, i.e. channels λx, towards the two Optical Splitters 102, 104, which is configured to individually spread and direct the wavelengths λ, i.e. channels λ, towards one or more ports 78a-d of a service equipment arrangement 70.

Said service equipment arrangement 70 comprises service equipment means 72, 74 for providing different services, e.g. mobile broadband, business services and residential services. Two of said ports 78a, 78b are dedicated to a service equipment means 72, and two of said ports 78c, 78d are dedicated to a service equipment means 74.

In this example, data traffic may be sent from another CO, denoted CO Y, on an optical fibre, e.g. 14b, according to wavelength-division multiplexing, WDM. Data traffic is sent on a wavelength band involving channels λy, e.g. $\lambda_{21}$-$\lambda_{40}$, from said second CO to the hub device 50.

As illustrated in the present example, a port 52 is connected to a corresponding WSS 80. Thus, as a fibre is connected to a certain CO, a WSS 80 will be handling the data traffic on said fibre and direct said channels towards the WSS 80. The WSS 80 will direct the channels towards the optical splitter arrangement 100. The optical splitter arrangement 100 is configured by means of the hub controller 90 to control and direct the wavelengths λy, i.e. channels λy, from the optical splitter arrangement 100 to the correct MC-OMs, 78, of the service equipment arrangement 70 for optical traffic requesting a certain service. The hub controller may be configured to control the optical splitters 102, 104, e.g. by means of controllable optical filters, to let the channels dedicated for a certain service of a number of services Eq 1, Eq 2, which services are provided by dedicated service arrangement means 72, 74 comprising one or more ports. Two of said ports 78a, 78b are dedicated to a service equipment means 72, and two of said ports 78c, 78d are dedicated to a service equipment means 74. In each of said ports one Multi-Channel Optical Module, MC-OMs, 78 are plugged into the ports. Said MC-OMs 78 are configured to receive and transmit optical traffic on different wavelengths λ, i.e. channels λ of the received wavelength channels λx and λy. If the received wavelength channels λx and λy together comprises channels $\lambda_1$-$\lambda_{40}$, one MC-OM, indicated 1, and plugged into port 78a of the dedicated service arrangement means 72 may be tuned to one or more of channels $\lambda_1$-$\lambda_{20}$, while the other MC-OM, indicated 2, and plugged into port 78b may be tuned to one or more of channels $\lambda_{21}$-$\lambda_{40}$. Corresponding for service arrangement means 74, one MC-OM, indicated 1, and plugged into port 78c may be tuned to one or more of channels $\lambda_1$-$\lambda_{10}$, while the other MC-OM, indicated 2, and plugged into port 78d, may be tuned to one or more of channels $\lambda_{11}$-$\lambda_{40}$. Said tuning and control of the optical transceiver modules is provided by means of the hub controller 90, an Operation Administration and Maintenance connectivity software module, OAM Conn, and OAM communication to the MC-OMs comprising an Operation, Administration and Maintenance OAM unit 224, which typically is a digital processor, microprocessor, etc. If the received wavelength channels λx and λy together comprises channels $\lambda_1$-$\lambda_{40}$, each of the MC-OMs may receive any of said channels and be tuned to one or more of channels $\lambda_1$-$\lambda_{40}$. The flexibility is provided by the configuration and position of the optical splitters between the WSSs and the ports of the service equipment means 72, 74 in addition with the flexible control of the optical transceiver modules 78.

The dedicated service arrangement means 72, 74 of the service equipment arrangement 70 is configured to digitally process the received data information. After the content of a data packets of a certain channel has been processed, said processed data packets are resent by means of Multi-Channel Optical Module, MC-OMs, 78. The optical splitter arrangement 100 receives the processed data packets on the channels $\lambda_1$-$\lambda_{40}$. The optical splitter arrangement 100 may be configured by means of the hub controller 90 to control and direct the wavelengths channels λ, from the optical splitter arrangement 100 to the correct WSS 80 for further distribution the correct port 52 and fibre 14.

Connection 82 enables direct wavelength layer connection between COs connected to the upper 52 and lower 52 (cf FIG. 4) without the traffic needing to go through Equipments 72, 74.

In FIG. 2, the WSSs 80 could be redundant to each other. For example, optical fibre 14a is single-homed connection between a CO node and the hub. By means of good planning of the hub and network configuration, the lower WSS 80 may be configured to become redundant to the top WSS 80. The lower WSS 80 provides resilience when the connection 14a is broken to said CO node if the port 52 of the lower WSS has been connected via the optical fibre 14b to the CO node. Such a configuration enables short service interruptions in case upgrades are needed, such as in-service upgrade capability e.g. by increasing bandwidth from 1 Gbps per channel to 10 Gbps per channel.

Figure 3:
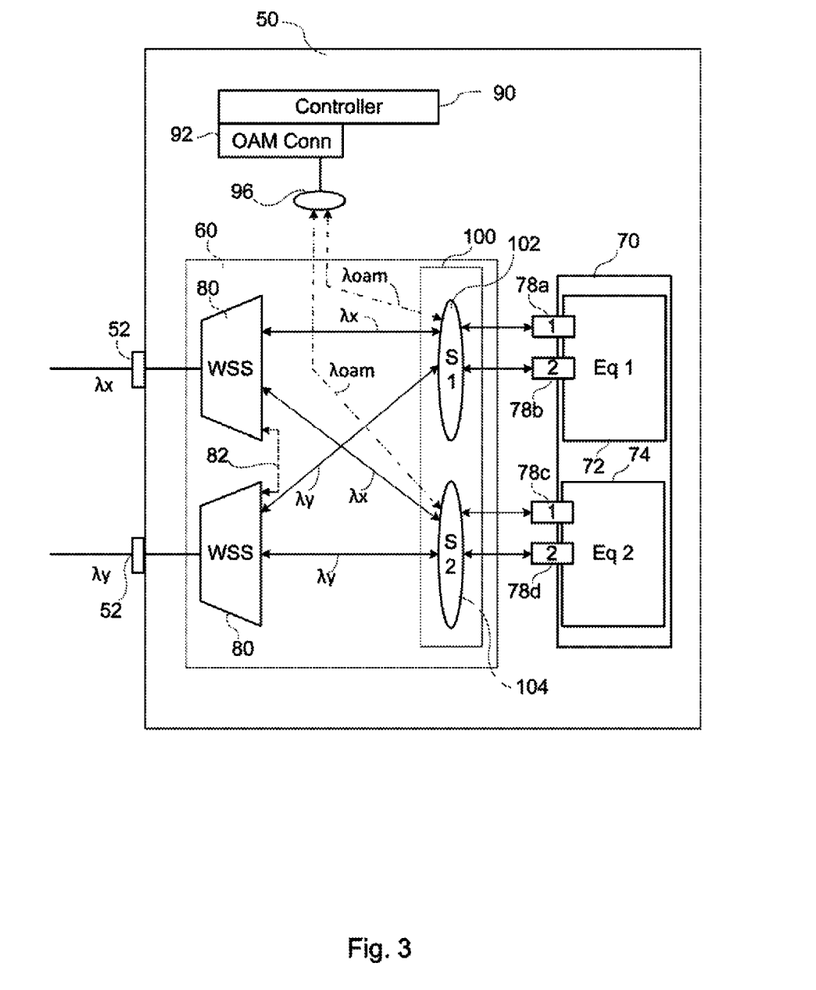
FIG. 3 is a block diagram illustrating further one example of an embodiment of a hub configuration according to the invention.

A second embodiment is exemplified in FIG. 3. In comparison with the first exemplified embodiment, the second embodiment is in most details similar to the first embodiment described above with reference to FIG. 2. The two embodiments differ in that the hub controller 90 of the second embodiment is further provided with an Operation Administration and Maintenance connectivity software module, OAM Conn, 92 for handling, monitoring and controlling the Multi-Channel Optical Module, MC-OMs, 78. Said OAM Conn 92 is further provided with a port or interface 96 for controlling the operation and function of the MC-OMs 78 by means of control signalling. Another benefit of the proposed embodiment is enabling point-to-multi-point (p2mp) physical (out-of-band) OAM communication λoam to the MC-OMs, indicated by dash-dot-dot lines in FIG. 3. This is especially beneficial in the case the hub equipments are not managed by the same operator managing the optical network so that the MC-OMs cannot be managed from the electrical domain. In other words, a clear hub side demarcation for the MC-OMs is needed. A p2pm mechanism like GPON, or EPON, is beneficial since only one hub controller OAM connectivity port 96 is needed, i.e. GPON OLT transceiver and MAC chip. The MC-OMs would then need to have an internal optical filter to filter out the OAM wavelength λoam in addition to a GPON ONU (Optical Network Unit) transceiver and MAC chip. An implementation of a MC-OM is described in FIG. 6.

Figure 4:
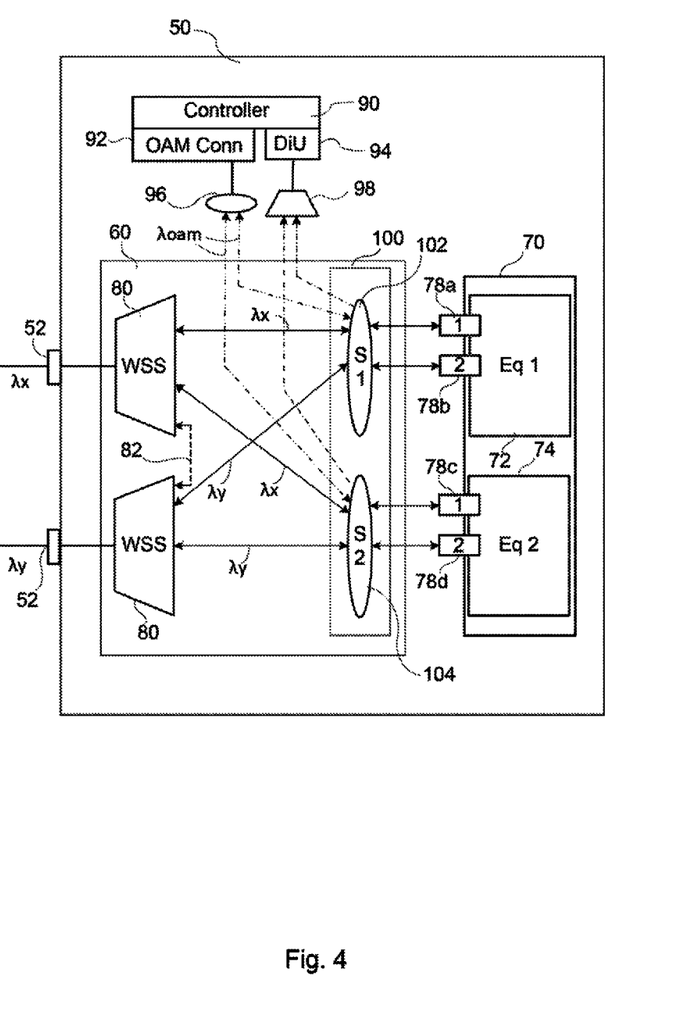
FIG. 4 is a block diagram illustrating another example of an embodiment of a hub configuration according to the invention.

An example of a third embodiment is present in FIG. 4. In this example, compared to the first end second embodiments described above, the hub controller 90 is provided with a centralized Discovery Unit, DiU, 94 for enabling the possibility to discover new hub side ports. The Discovery Unit may be implemented as software executed by the hub controller 90. Said DiU 94 is further provided with a wavelength channel selector 98 that is operating as a port or interface for connecting to, see dot-dashed lines, the optical splitter arrangement 100. The selector device is used for the DiU 94 to select which of the incoming fibres to scan for new wavelengths/ports. Such selector device may for example be implemented by a simplified WSS, or an optical N×1 switch with a scanning optical filter.

Figure 5:
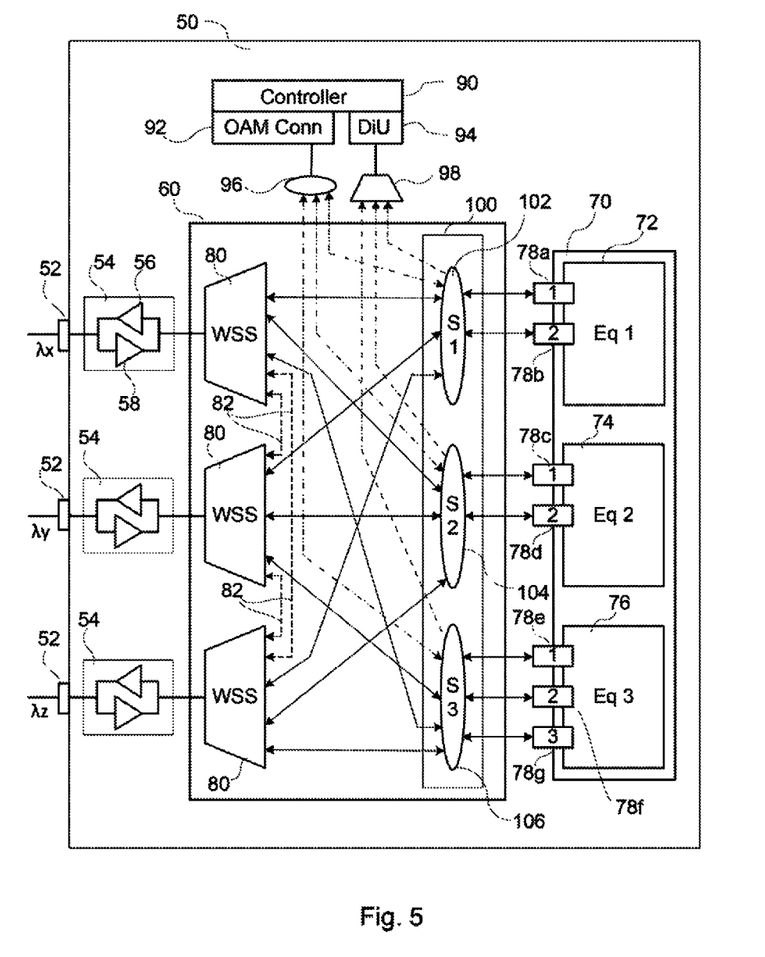
FIG. 5 is a block diagram illustrating further another example of an embodiment of a hub configuration according to the invention.

Further one embodiment is illustrated in FIG. 5. This embodiment comprises further one WSS 80, further one service arrangement Eq 3 76, and one optical splitter S3 106.

Additionally, between each port 52 and WSS 80 is a bi-directional optical amplifier arrangement 54 inserted. Said arrangement 54 comprises one optical amplifier 58 for amplifying the incoming optical signal on the optical fibre connected to the port 52 and one optical amplifier 56 for amplifying the outgoing optical signal.

As illustrated in the present example, a port 52 is connected to a corresponding WSS 80. Thus, as a fibre is connected to a certain CO, denoted CO Z, a WSS 80 will be handling the data traffic on said fibre and direct channels λz towards the WSS 80. The WSS 80 is configured to spread and direct the channels λz towards the optical splitter arrangement 100. The optical splitter arrangement 100 is configured by means of the hub controller 90 to control and direct the wavelength channels λz, from the optical splitter arrangement 100 to the correct MC-OMs, 78, of the service equipment arrangement 70 for optical traffic requesting a certain service. The hub controller may be configured to control the optical splitters 102, 103, 104 e.g. by means of controllable optical filters, to let the channels dedicated for a certain service of a number of services Eq 1, Eq 2, Eq. 3 which services are provided by dedicated service arrangement means 72, 74, 76 comprising one or more ports. Two of said ports 78a, 78b are dedicated to a service equipment means 72, two of said ports 78c, 78d are dedicated to a service equipment means 74 and three ports 78e, 78f, 78g are dedicated to a service equipment means 76. In each of said ports one Multi-Channel Optical Module, MC-OMs, 78 are plugged into the ports. Said MC-OMs 78 are configured to receive and transmit optical traffic on different wavelengths λ, i.e. channels λ of the received wavelength channels λx, λy and λz. If the received wavelength channels λx, λy and λz together comprises channels $\lambda_1$-$\lambda_{70}$, each of the MC-OMs may receive any of said channels and be tuned to one or more of channels $\lambda_1$-$\lambda_{70}$, by means of the flexibility provided by the configuration and position of the optical splitters between the WSSs and the ports of the service equipment means 72, 74, 76 in addition with the flexible control of the optical transceiver modules 78.

In the examples above, hub embodiments comprise only two or three WSSs 80 and two or three service equipments in the service equipment arrangement 100. In reality the number of WSSs and Equipments at a hub site may be large, e.g. 10-100 WSSs. Due to the link budget limits, the splitter sizes are limited. For example, a 16:16 splitter has about 14 dB insertion loss and combined with the WSS insertion loss of 5 dB or so, a 0 dBm per channel output power of the OM would have to be amplified at the WSS common port, to be able to bridge the fibre and subsequent WSS loss budget. Such splitter sizes are also in line with typical WSS port numbers (4-23).

Figure 6:
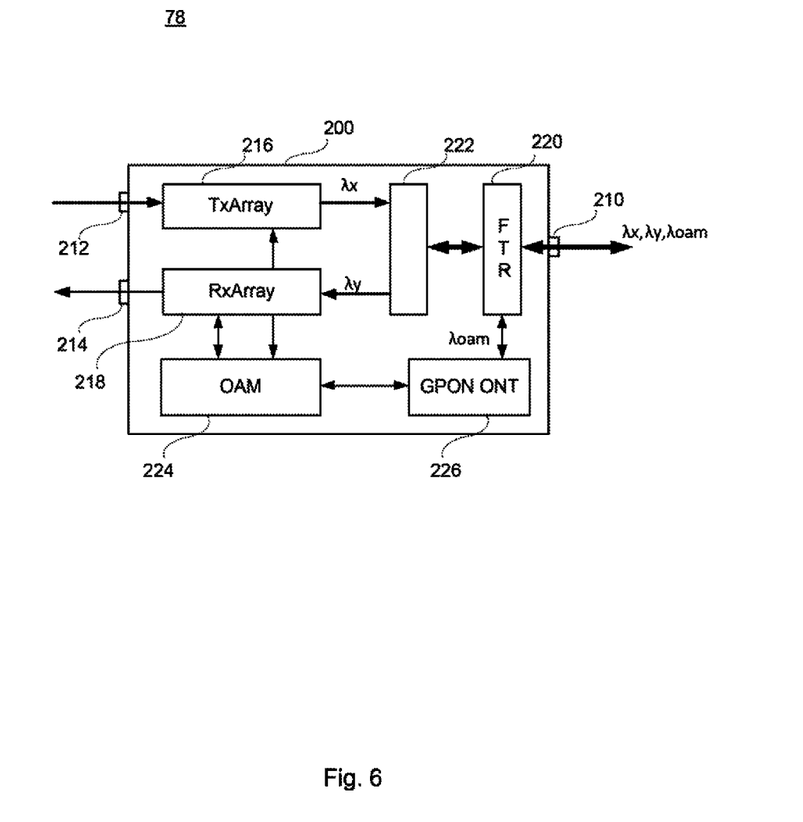
FIG. 6 is an embodiment of an optical transceiver module.

FIG. 6 illustrates an embodiment of an optical transceiver module 78, e.g. a Single-Channel Module or Multi-Channel Optical Module (MC-OM) 78. Said MC-OM 78 comprises a housing 200, which may have a number of ports, contacts and/or interfaces for enabling connection to other physical entities which the device 78 interacts with. In the exemplified embodiment, the housing 200 of the MC-OM 78 may have an optical port 210, a first electrical contact 212 and a second electrical contact. In the illustrated example, the MC-OM 78 further may comprise a transmitter array 216 and a receiver array 218 for enabling the transceiver functionality. A filter 220 is arranged for directing the received (via the optical port 210) wavelength or wavelengths of interest $\lambda x$, $\lambda y$ and $\lambda oam$ to filter 222 and the Gigabit-Capable Passive Optical Network Optical Network Termination (GPON ONT) unit 226 and the Operation, Administration and Maintenance OAM unit 224, which typically is a digital processor, microprocessor, etc. The OAM 224 is also able to control and tune the TxArray 224 and the RxArray 218 to wavelengths of interest. A switching filter 222 directs incoming wavelength channels $\lambda x$, $\lambda y$ onto the RxArray 218 that converts the modulated information from the optical domain into the electrical domain for further forwarding as electrical signals via the second electrical contact 214. Said contact may be connected to a data information processing device (not shown). The TxArray 216 operates in the other, opposite, direction. The transmitter array 216 receives via the first electrical contact 212 information, e.g generated by a data information processing device (not shown), to be sent and converts it to the optical domain. The TxArray 216 is capable to transmit received information onto modulated wavelengths channels in dependence of the destination of the information, i.e. each destination has one or more dedicated wavelengths $\lambda x$, $\lambda y$. The switching filter 222 and optical filter 220 direct the transmitted wavelengths via the optical port 210 for further transmission via the optical splitters (102, 104 in FIG. 2) and the WSSs (80 in FIG. 2) to the CO connected ports (e.g. 52 in FIGS. 2-5).

A point-to-multipoint (p2mp) mechanism like GPON (or Ethernet PON etc) is beneficial since only one OAM connectivity port is needed ie GPON OLT (Optical Line Terminal) transceiver (see 96 in FIG. 3). The MC-OMs need to have an internal optical filter 220 to filter out the OAM wavelength or wavelengths $\lambda oam$ in addition to a GPON ONT transceiver 226 and OAM device 224 (e.g. a microprocessor). Of course, there may also be a need for control plane communication between the hub controller 90 and the hub node equipments to set up new (e.g. multi-layer) connections. Such control plane interface to the hub controller is not illustrated and is considered to not be involved in this invention.

Thus, the hub controller 90 (see FIG. 3 or 4) provided with an Operation, Administration and Maintenance connectivity software module (OAM Conn) 92 and a GPON OLT transceiver 96 is capable of communicating in the optical layer via dedicated control wavelength channels $\lambda oam$ with the OAM 224 for handling, monitoring and controlling the MC-OM 78. The filter 220 is capable of directing said OAM wavelength(-s) $\lambda oam$ to the GPON ONT 226 which converts the control information carried by the OAM wavelength(-s) $\lambda oam$ to digitally processable electrical signals. Said path is bi-directional, thus the OAM device 224 may communicate via the GPON ONT 226 that converts digitally processable electrical signals to modulated OAM wavelength(-s) $\lambda oam$, which are directed to the optical filter 220 that directs the transmitted wavelengths $\lambda oam$ via the optical port 210 for further transmission via the optical splitters (102, 104 in FIG. 2) to the OAM Conn (see 92 in FIG. 3) and/or the hub controller (see 90 in FIG. 3).

Said one or more OAM wavelengths $\lambda oam$, or control wavelength channels, are indicated by dash-dot-dot lines in FIGS. 2-5, and this configuration enables p2mp physical (out-of-band) OAM communication to the MC-OMs 78.

The described embodiment of MC-OMs is important in the case the hub equipments are not managed by the same operator managing an optical network, e.g. a Metnet, so that the MC-OMs cannot be managed from the electrical side. In other words, a clear hub side transport service demarcation for the MC-OMs is needed in order to assure that the agreed service level is met.

The above described control devices, i.e. hub controller 90, Operation, Administration and Maintenance connectivity software module (OAM Conn) 92 and Operation, Administration and Maintenance OAM unit 224, may be implemented in digital electronically circuitry, or in computer hardware, firmware, software, or in combinations of them. Different aspects of the invention may be implemented as a computer program product tangibly embodied in a machine readable storage device for execution by a programmable processor; and method steps may be performed by a programmable processor executing a program of instructions to perform functions of the invention by operating on input data and generating output.

Aspects of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

Figure 7:
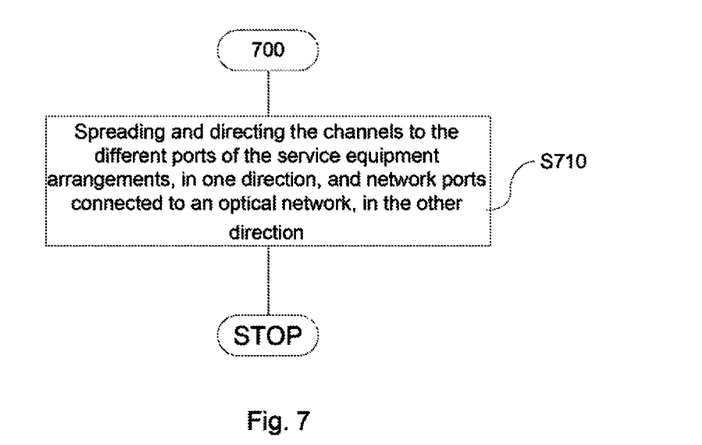
FIG. 7 is a flowchart illustrating one embodiment of a method according to the invention.

FIG. 7 is a flowchart illustrating an example of a method 700 according to one aspect of the invention. The exemplified embodiment may be performed in an embodiment of the above described service edge hub devices, which is attachable to an optical network carrying data traffic comprising data information on a number of optical wavelength channels $\lambda=\lambda i$ (i=1, 2, 3, , , , ) in one or more optical fibres. Said hub device is provided with one or more optical ports connected to one or more service equipment arrangements 70 for digital processing the received data information. The hub device further comprises a wavelength switching means 60 configured to connect each channel to ports connected to the one or more of the service equipment arrangement 70. The method comprises:

S710: Spreading and directing the channels to the different ports of the service equipment arrangements, in one direction, and network ports connected to the optical network, in the other, opposite, direction. The received optical wavelength channels are spread and directed to the different ports of the service equipment arrangements 70 by means of the wavelength switching means 60 comprising an optical splitter arrangement 100. As described above, the optical splitter arrangement 100 may comprise one or more optical splitters 102,104 for directing in both directions between the ports of the wavelength switching means 60 and the ports of the service equipment arrangement 70. The one or more optical ports may comprise an optical transceiver module 78, which is single- or multi-channel wavelength capable.

Figure 8:
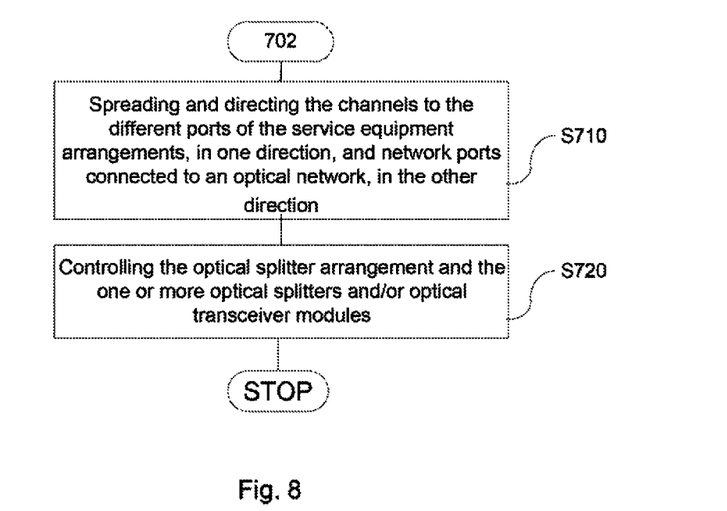
FIG. 8 is a flowchart illustrating another embodiment of a method according to the invention.

FIG. 8 is a flowchart illustrating further one embodiment 702 according to the above descried method and aspect of the invention. This embodiment also involves the step S710, as described above. It also involves a step S720:

S720: Controlling the optical splitter arrangement and the one or more optical splitters and/or optical transceiver modules.

According to this embodiment, the hub controller 90 of the hub device is configured to control the optical splitter arrangement 100 and the one or more optical splitters 102,104 and/or optical transceiver modules, single- or multi-channel wavelength capable 78.

Figure 9:
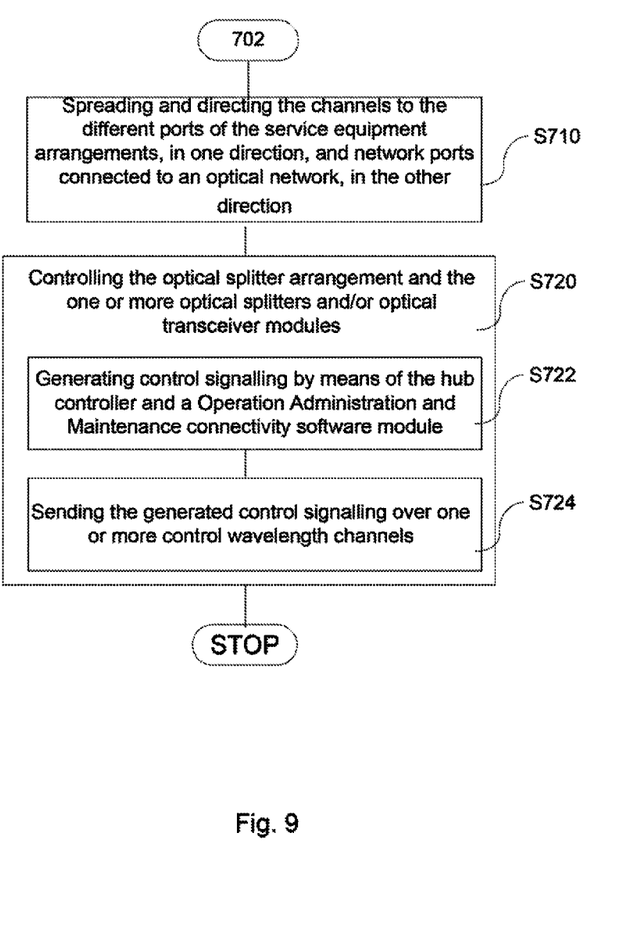
FIG. 9 is a flowchart illustrating further one embodiment of a method according to the invention.

FIG. 9 is a flowchart illustrating further one embodiment 704 according to the above descried method and aspect of the invention. This embodiment also involves the steps S710 and S720, as described above. The embodiment may also involve handling and controlling the Optical splitter arrangement 100 and the optical splitters 102, 104 therein and/or the optical transceiver modules, single- or multi-channel wavelength capable 78 by means of an Operation Administration and Maintenance connectivity software module 92.

Thus, in this embodiment S720 comprises S722:

Generating control signalling by means of the hub controller and a Operation Administration and Maintenance connectivity software module. The hub controller may be provided with a special unit 92 for controlling the operation, administration and maintenance of the connectivity of the optical transceiver modules 78, MC-OMs. The hub controller 90 is in this embodiment configured to control the operation of said unit 92.

The unit 92 is also configured to perform S724:

Sending the generated control signalling over one or more control wavelength channels.

The unit is configured to send the generated control signalling to the Optical Splitter arrangement 100 and the optical splitters 102, 104 and/or optical transceiver modules, single- or multi-channel wavelength capable 78 over a control wavelength channel. The unit is provided with a port or interface 96. A point-to-multipoint (p2mp) mechanism like GPON (or EPON etc) is beneficial since only one OAM connectivity port is needed, i.e. GPON OLT transceiver (see 96 in FIG. 3). Each of the optical transceiver modules have an internal optical filter 220 to filter out the control channel wavelength or wavelengths $\lambda$oam in addition to a GPON ONT transceiver 226 and OAM device 224, as described above. Thus, the hub controller 90 (see FIG. 3 or 4) provided with an Operation, Administration and Maintenance connectivity software module (OAM Conn) 92 and a GPON OLT transceiver 96 is capable of communicating in the optical layer via dedicated control wavelength channels $\lambda$oam with the OAM 224 for handling, monitoring and controlling the optical transceiver modules, MC-OM, 78. The filter 220 is capable of directing said OAM wavelength(-s) $\lambda$oam to the GPON ONT 226 which converts the control information carried by the OAM wavelength(-s) to digitally processable electrical signals.

As should be understood of the above description, the different aspects of the invention and above described embodiments all improve the flexibility of service edge hub devices.

As a comparison, a straightforward solution of a hub device is to connect each optical transceiver module to a WSS port. Such a configuration of a hub device 150 is illustrated in FIG. 10.

The illustrated hub device 150 comprises bi-directional optical amplifier arrangements 54, controller 90, WSSs 80, optical transceiver modules OM and service equipment means 72, 74, 76.

Figure 10:
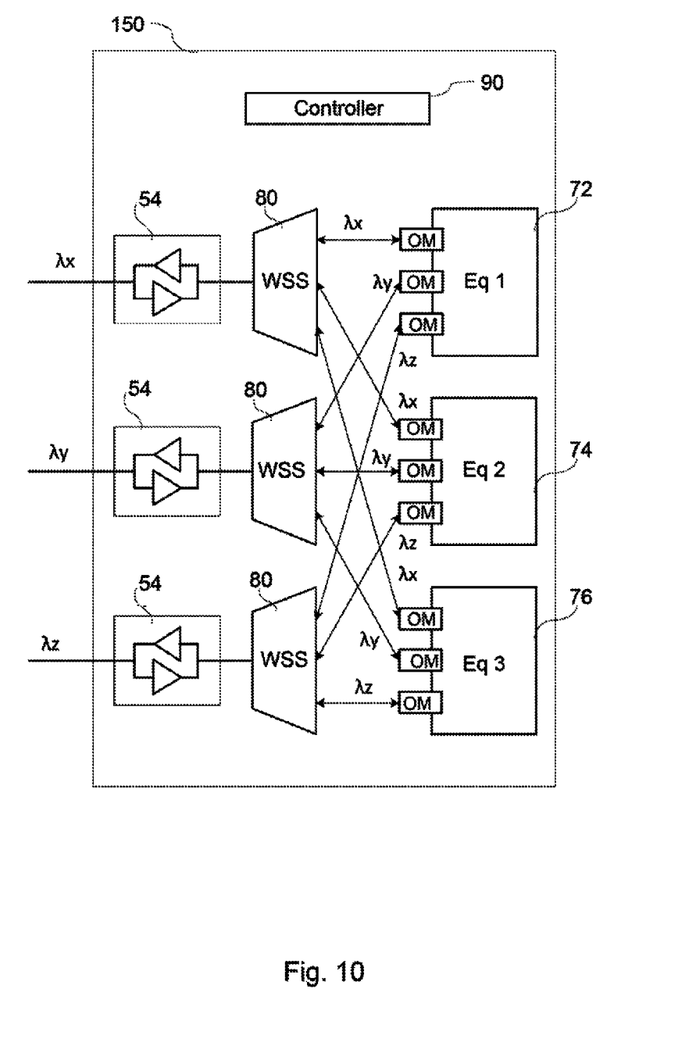
FIG. 10 is a block diagram illustrating a straight forward hub configuration.

As an example from FIG. 10 different services (mobile broadband backhaul, business services, and residential services) are illustrated/exemplified with different equipments, which have multiple optical transceiver modules OM, single-channel or multi-channel modules. However, such modules OM may not necessarily be tunable, which leads to the problems:

Underutilization as ports may not be needed for those particular connected COs or may be of the wrong wavelength for the service provided by the port;

Lack of ports for a particular service.

Even if every channel and OM is tunable, not all channels in a OM, which represent a particular service, may be needed for the connected COs. This will result in a reduced channel utilization.

The connections are between hubs and different COs, through which traffic is being aggregated to/distributed from the Hub node. In this example, each service may have maximum 40 channels $\lambda$x, $\lambda$y or $\lambda$z possible to direct to a particular CO (X,Y, Z). Likely, not all of these COs will need exactly the same amount of wavelengths for different services: CO X may need to connect with 30 wavelengths from Equipment 1, 20 channels from Equipment 2, 42 channels from Equipment 3 etc. Since the wavelengths $\lambda$x, $\lambda$y and $\lambda$z can not be shared between different WSS ports, this would result in equipment/wavelength underutilization, or would require more equipment to be installed. Moreover, in case the access networks of the individual COs have fixed filters, a particular access node may not be able to receive the available wavelengths from a particular Equipment. Thus, wavelength blocking may occur. Moreover, for a single-homed Hub node scenario, port- and fiber-protection would require to duplicate the optical modules at the Hub site. For the architecture in FIG. 10, it would be rigid for traffic to be diverted between primary and backup OM/equipment.

The present embodiments of invention propose to use N:N splitters in between a pool of MC-OM and WSSes. The splitters would then allow each channel of the pool of modules to be used at different WSSes. This way, efficient use of the optical channel resources can be achieved. Combined, the architecture in FIG. 10 imposes severe constraints.

Compared to the above described embodiments of the invention, see e.g. the embodiment illustrated by FIG. 5, the OMs 78 are configured to receive and transmit optical traffic on different wavelengths channels A of the received wavelength channels λx, λy and λz. If the received wavelength channels λx, λy and λz together comprises channels $\lambda_1$-$\lambda_{70}$, each of the OMs may receive any of said channels and be tuned to one or more of channels $\lambda_1$-$\lambda_{70}$, by means of the flexibility provided by the configuration and position of the optical splitters between the WSSs and the ports of the service equipment means 72, 74, 76 in addition with the flexible control of the optical transceiver modules 78.

A number of embodiments of the present invention have been described. It will be understood that various modifications may be made without departing from the scope of the invention. Therefore, other implementations are within the scope of the following claims defining the invention.

The invention claimed is:

1. A service edge hub device attachable to an optical network carrying data traffic comprising data information on a number of optical wavelength channels, said hub device comprising:
    a plurality of network ports, each network port being configured to receive and transmit the data information on a different one of the optical wavelength channels;
    a plural number N of optical ports connectable to one or more service equipment arrangements for processing the data information received via the network ports;
    a wavelength switching means configured to connect each optical wavelength channel to the N optical ports,
    wherein the wavelength switching means comprises an N:N optical splitter arrangement configured to:
        spread and direct the optical wavelength channels to the N optical ports, the N optical ports being connectable to the one or more service equipment arrangements, in one direction, and
        spread and direct the optical wavelength channels to the plurality of network ports in the other direction to facilitate flexible selection of one of the optical wavelength channels for use at each of the network ports, wherein the N:N optical splitter arrangement comprises one or more optical splitters for directing channels in both directions between the wavelength switching means and the one or more service equipment arrangements, and wherein one or more of the N optical ports connectable to the one or more service equipment arrangements comprise an optical transceiver module, which is single- or multi-channel wavelength capable; and
    a hub controller for controlling the N:N optical splitter arrangement and the one or more optical splitters and/or optical transceiver modules.

2. The service edge hub device according to claim 1, wherein the service edge hub device comprises one or more of said more service equipment arrangements.

3. The service edge hub device according to claim 1, wherein the wavelength switching means comprises one or more Wavelength Selective Switches for directing received optical wavelength channels (λ) to the N:N optical splitter arrangement, said optical wavelength channels being received from the optical network, and for receiving channels from the one or more service equipment arrangements via the N optical ports and distributing said channels received from the one or more service equipment arrangements to the network ports.

4. The service edge hub device according to claim 1, wherein the hub controller is provided with an Operation Administration and Maintenance connectivity software module for handling and controlling the N:N Optical splitter arrangement and the optical splitters therein and the optical transceiver modules.

5. The service edge hub device according to claim 4, wherein the Operation Administration and Maintenance connectivity software module is further provided with an interface for controlling operation and function of the N:N Optical Splitter arrangement and the optical splitters and the optical transceiver modules by means of control signalling generated by the hub controller and sent over a control wavelength channel.

6. A method in a service edge hub device attachable to an optical network carrying data traffic comprising data information on a plurality of optical wavelength channels, said method comprising:
    receiving and transmitting data information on a different one of the plurality of optical wavelength channels through each of a plurality of network ports of the service edge hub device;
    spreading and directing the optical wavelength channels to a plural number of N optical ports, which are connectable to one or more service equipment arrangements for processing the data information received via the network ports, by means of a wavelength switching means of the hub device,
    wherein the wavelength switching means comprises an N:N optical splitter arrangement configured to:
        spread and direct the optical wavelength channels to the N optical ports in one direction, and
        spread and direct the optical wavelength channels to the plurality of network ports, connected to the optical network, in the other direction to facilitate flexible selection of one of the optical wavelength channels for use at each of the network ports, wherein the N:N optical splitter arrangement comprises one or more optical splitters for directing channels in both directions between the wavelength switching means and the one or more service equipment arrangements, and wherein one or more of the optical ports connected to the one or more service equipment arrangements comprise an optical transceiver module, which is single- or multi-channel wavelength capable; and
    controlling the N:N optical splitter arrangement and the one or more optical splitters and/or optical transceiver modules, wherein the service edge hub device comprises a hub controller for controlling the N:N optical splitter arrangement and the one or more optical splitters and/or the optical transceiver modules.

7. The method according to claim 6, the method comprising handling and controlling the N:N Optical splitter arrangement and the optical splitters therein and the optical transceiver modules by means of an Operation Administration and Maintenance connectivity software module connected to a hub controller.

8. The method according to claim 6, the method comprising handling and controlling the N:N Optical Splitter arrangement and the optical splitters and/or the optical transceiver modules by
    Generating control signalling by means of the hub controller and an Operation Administration and Maintenance connectivity software module;
    Sending the generated control signalling over one or more control wavelength channels.

9. A node in an optical communications network, wherein the node comprises a service edge hub device according to claim 1, which is connected to the optical network.

10. The node according to claim 9, wherein the node is a hub node in a MetNet optical communications network.

* * * * *